(12) United States Patent
Ahdoot

(10) Patent No.: US 7,529,404 B2
(45) Date of Patent: May 5, 2009

(54) DIGITAL VIDEO FILTER AND IMAGE PROCESSING

(76) Inventor: Ned M. Ahdoot, 6916 Kings Harbor Dr., Ranch Palos Verdes, CA (US) 90275

( * ) Notice: Subject to any disclaimer, the term of this patent is extended or adjusted under 35 U.S.C. 154(b) by 170 days.

(21) Appl. No.: 11/820,683

(22) Filed: Jun. 20, 2007

(65) Prior Publication Data

US 2008/0317369 A1    Dec. 25, 2008

(51) Int. Cl.
*G06K 9/00* (2006.01)
(52) U.S. Cl. .................................... 382/162
(58) Field of Classification Search ......... 382/162–167, 382/254, 260–265; 348/221.1, 223.1, 234, 348/242, 253
See application file for complete search history.

(56) References Cited

U.S. PATENT DOCUMENTS

| | | | |
|---|---|---|---|
| 6,426,771 B1 * | 7/2002 | Kosugi | 348/222.1 |
| 6,825,876 B1 * | 11/2004 | Easwar et al. | 348/234 |
| 7,085,795 B2 | 8/2006 | Debes | |
| 7,120,286 B2 | 10/2006 | Yu | |
| 7,205,520 B1 | 4/2007 | Busse | |
| 7,369,161 B2 * | 5/2008 | Easwar et al. | 348/222.1 |
| 2002/0146178 A1 | 10/2002 | Bolle | |
| 2003/0052886 A1 | 3/2003 | Naegle | |
| 2003/0063095 A1 | 4/2003 | Deering | |
| 2003/0095698 A1 | 5/2003 | Kawano | |
| 2003/0123584 A1 | 7/2003 | Siegel | |
| 2003/0187824 A1 | 10/2003 | MacInnis | |
| 2003/0194009 A1 | 10/2003 | Srinivasan | |
| 2003/0234785 A1 | 12/2003 | Matsuda | |
| 2004/0071338 A1 | 4/2004 | Nefian | |
| 2004/0181564 A1 | 9/2004 | MacInnis | |
| 2005/0089240 A1 | 4/2005 | Gindele | |
| 2006/0050083 A1 | 3/2006 | Lachine | |

* cited by examiner

*Primary Examiner*—Jose L Couso

(57) ABSTRACT

An apparatus for video digital color pixel filtering and digital image processing that eliminates the need for Furrier Transforms, thus eliminating time-consuming multiplication and additions. It utilizes a new distributed computer architecture that operates in conjunction with First In First Out memories, utilizing simple software for each processor to minimize latency issues of real time interactive digital image processing. The distributed processing architecture is set up to operate in a manner similar to factory assembly lines, wherein FIFO's carry semi processed data from one processor to another. A unique memory based system is used to measure motion vectors including distances and rotational vectors, of moving objects moving in a six degree of freedom.

10 Claims, 16 Drawing Sheets

\* CROSS SECTION OF LINES 201 & 200 IS 209

Midpoint Y (column) Coordinate Processor Input

Old frame | Column n | New Frame
--- | --- | ---
 | | 11
 | | 11
 | | 11 ← New object
 | | 11
 | | 11
1 | | 1
1 | Column n +1 | 1
2 | | 2
3 | | 3
1 | | 1
2 | Column n +2 | 2
3 | | 3
1 | | 1
2 | Column n +3 | 2
3 | | 3
1 | | 1
2 | | 2
3 | Column n +4 | 3
4 | | 4
1 | | 1
2 | | 2
3 | Column n +5 | 3
4 | | 4
2 | | 2
3 | | 3
4 | Column n +6 | 4
5 | | 5
6 | | 6
3 | | 3
4 | Column n+7 | 4
5 | | 5
6 | | 6
4 | | 4
5 | Column n +8 | 5
6 | | 6
4 | | 4
5 | | 5
6 | Column n +9 | 6
7 | | 7
8 | | 8
→ 10 | | 10

Object # 10 is in the same x coordinate as #1

4 | | 4
5 | | 5
6 | | 6
7 | | 7
8 | Column n+10 | 8
10 | | 10
9 | | ← End of detection of object 9
4 | | 4
5 | Column n +11 | 5
6 | | 6

Figure 7C

Object Identification Processor
Input

| Old Frame | New frame |
|-----------|-----------|
|           | 11        |
| 1         | 1         |
| 2         | 2         |
| 3         | 3         |
| 4         | 4         |
| 5         | 5         |
| 6         | 6         |
| 7         | 7         |
| 8         | 8         |
| 9         |           |
| 10        | 10        |

Figure 8A

DIGITAL VIDEO FILTER AND IMAGE PROCESSING

FIELD OF INVENTION

The present invention relates to the digital video colored filtering, and image processing consisting of hardware and software, and more particularly to the art of image recognition, image identification, and image tracking.

BACKGROUND OF THE INVENTION

The present invention relates to the efficient filtering of colored video images, thus eliminating the need for use of complex Fourier Transforms. Fourier Transforms, by their nature slow down the digital image processing. In addition it utilizes a unique computer architecture that resembles a typical car assembly lines to identify emergence, disappearance, and directional and rotational changes of multicolored objects in a six-degree of freedom of space.

There are varieties of filtering and image processing systems available, in which none of them provide the capabilities of this application either in singular or plural technical aspects. Such filtering and image processing systems, fail to provide the critical speed needed in real time interactive monition capture of moving objects and an interactive response. The following are the patent number and small descriptions of some of the interactive hem.

Gindele; Edward B. U.S. 20050089240 discloses a method of processing a digital image to improve tone scale, includes the steps of: generating a multiresolution image representation of the digital image including a plurality of base digital images and a plurality of residual digital images; applying a texture reducing spatial filter to the base digital images to produce texture reduced base digital images; combining the texture reduced base digital images and the residual digital images s to generate a texture reduced digital image; subtracting the texture reduced digital image from the digital image to produce a texture digital image; applying a compressive tone scale function to the texture reduced digital image to produce a tone scale adjusted digital image having a compressed tone scale in at least a portion of the image; and combining the texture digital image with the tone scale adjusted digital image to produce a processed digital image, whereby the contrast of the digital image is improved without compressing the contrast of the texture in the digital image.

Srinivasan; Sridhar U.S. 20030194009 discloses various techniques and tools for approximate bicubic filtering are described. For example, during motion estimation and compensation, a video encoder uses approximate bicubic filtering when computing pixel values at quarter-pixel positions in reference video frames. Or, during motion compensation, a video decoder uses approximate bicubic filtering when computing pixel values at quarter-pixel positions.

Deering; Michael F. U.S. 20030063095 discloses a graphics system comprises a graphics processor, a sample buffer, and a sample-to-pixel calculation unit. The graphics processor generates samples in response to received stream of graphics data. The sample buffer may be configured to store the samples. The sample-to-pixel calculation unit is programmable to generate a plurality of output pixels by filtering the rendered samples using a filter. A filter having negative lobes may be used. The graphics system computes a negativity value for a first frame. The negativity value measures an amount of pixel negativity in the first frame. In response to the negativity value being above a certain threshold, the graphics systems adjusts the filter function and/or filter support in order to reduce the negativity value for subsequent frames.

Debes; Eric U.S. Pat. No. 7,085,795 discloses an apparatus and method for efficient filtering and convolution of content data are described. The method includes organizing, in response to executing a data shuffle instruction, a selected portion of data within a destination data storage device. The portion of data is organized according to an arrangement of coefficients within a coefficient data storage device. Once organized, a plurality of summed-product pairs are generated in response to executing a multiply-accumulate instruction. The plurality of product pairs are formed by multiplying data within the destination data storage device and coefficients within the coefficient data storage device. Once generated, adjacent summed-product pairs are added in response to executing an adjacent-add instruction. The adjacent summed-product pairs are added within the destination data storage device to form one or more data processing operation results. Once the one or more data processing operation results are formed, the results are stored within a memory device.

Bolle; Rudolf M. U.S. 20020146178 discloses in an automatic fingerprint authentication or identification system, the fingerprint image acquisition is severely effected by the limitations of the acquisition process. The two modes of input, viz. scanning inked fingerprints from paper records or directly from a finger using live-scan fingerprint scanners suffer from the following noise sources in the input in addition to standard noise in the camera. Non-uniform ink application, uneven pressure while rolling on the paper or pressing on the scanner surface and external dirt like oil and climatic variations in the moisture content of skin are some of the main causes for the ridges and valleys not to be imaged clearly. This invention deals with a method of learning a set of partitioned least-squares filters that can be derived from a given set of images and ground truth pairs as an offline process. The learned filters are convolved with input fingerprint images to obtain the enhanced image.

Lachine; Vladimir U.S. 20060050083 discloses a method and system for circularly symmetric anisotropic filtering over an extended elliptical or rectangular footprint in single-pass digital image warping are disclosed. The filtering is performed by first finding and adjusting an ellipse that approximates a non-uniform image scaling function in a mapped position of an output pixel in the input image space. A linear transformation from this ellipse to a unit circle in the output image space is determined to calculate input pixel radii inside the footprint and corresponding filter coefficient as a function of the radius. The shape of the footprint is determined as a trade-off between image quality and processing speed. In one implementation, profiles of smoothing and warping components are combined to produce sharper or detail enhanced output image. The method and system of the invention produce natural output image without jagging artifacts, while maintaining or enhancing the sharpness of the input image.

MacInnis; Alexander G. U.S. 20040181564 discloses system and method of data unit management in a decoding system employing a decoding pipeline. Each incoming data unit is assigned a memory element and is stored in the assigned memory element. Each decoding module gets the data to be operated on, as well as the control data, for a given data unit from the assigned memory element. Each decoding module, after performing its decoding operations on the data unit, deposits the newly processed data back into the same memory element. In one embodiment, the assigned memory locations comprise a header portion for holding the control data corresponding to the data unit and a data portion for holding the substantive data of the data unit. The header information is written to the header portion of the assigned memory element once and accessed by the various decoding modules throughout the decoding pipeline as needed. The data portion of memory is used/shared by multiple decoding modules.

Yu; Dahai; U.S. Pat. No. 7,120,286 discloses a method and apparatus for tracing an edge contour of an object in three dimensional space is provided. The method and apparatus is utilized in a computer vision system that is designed to obtain precise dimensional measurements of a scanned object. In order to save focusing time during an automatic tracing measurement, multiple images may be collected and saved for a number of Z heights for a particular position of the XY stage. These saved images can later be used to calculate a focal position for each edge point trial location in the selected XY area rather than requiring a physical Z stage movement. In addition, a Z height extrapolation based on the Z heights of previous edge points can significantly speed up the searching process, particularly for objects where the Z height change of a contour is gradual and predictable.

Siegel; Erwin Frederick U.S. 20030123584 discloses a filter that includes an analyzer, thresholding circuit, and synthesizer. The analyzer generates a low-frequency component signal and a high-frequency component signal from an input signal. The thresholding circuit generates a processed high-frequency signal from the high-frequency component signal, the processed high-frequency signal having an amplitude of zero in those regions in which the high-frequency component signal has an amplitude that is less than a threshold value. The synthesizer generates a filtered signal from input signals that include the low-frequency component signal and the processed high-frequency signal. The filtered signal is identical to the input signal if the threshold value is zero. The analyzer is preferably constructed from a plurality of finite impulse response filters that operate on a small fraction of the input signal at a time.

Kawano; Tsutomu; U.S. 20030095698 discloses a feature extracting method for a radiation image formed by radiation image signals each corresponding to an amount of radiation having passed through a radiographed subject, has plural different feature extracting steps, each of the plural different feature extracting steps having a respective feature extracting condition to extract a respective feature value; a feature value evaluating step of evaluating a combination of the plural different feature values; and a controlling step of selecting at least one feature extracting step from the plural different feature extracting steps based on an evaluation result by the feature value evaluating step, changing the feature extracting condition of the selected feature extracting step and conducting the selected feature extracting step so as to extract a feature value again based on the changed feature extracting condition from the radiation image.

Naegle; U.S. 20030052886 discloses a video routing system including a plurality of video routers VR(0), VR(1), ..., VR(N.sub.R-1) coupled in a linear series. Each video router in the linear series may successively operate on a digital video stream. Each video router provides a synchronous clock along with its output video stream so a link interface buffer in the next video router can capture values from the output video stream in response to the synchronous clock. A common clock signal is distributed to each of the video routers. Each video router buffers the common clock signal to generate an output clock. The output clock is used as a read clock to read data out of the corresponding link interface buffer. The output clock is also used to generate the synchronous clock that is transmitted downstream.

Matsuda; Hideki; U.S. 20030234785 discloses in order to provide an image processing system and the like which can reduce calibration time, the image processing system comprises: a device profile storage section which stores ideal-environment-measurement data; a light separating section which derives output light data indicating output light from an image projecting section and ambient light data based on a difference between first and second viewing-environment-measurement data measured through a sensor, a projection-plane-reflectance estimating section which estimates a reflectance of a projection plane, based on the output light data and the ideal environment-measurement data; a sensing data generating section which generates viewing-environment-estimation data based on the reflectance, the ideal-environment-measurement data and the ambient light data; an LUT generating section which updates an LUT based on the viewing-environment-estimation data; and a correcting section which corrects image information based on the updated LUT.

Busse; Richard J. U.S. Pat. No. 7,205,520A discloses a ground based launch detection system consisting of a sensor grid of electro-optical sensors for detecting the launch of a threat missile which targets commercial aircraft in proximity to a commercial airport or airfield. The electro-optical sensors are configured in a wireless network which broadcast threat lines to neighboring sensors with overlapping field of views. When a threat missile is verified, threat data is sent to a centrally located processing facility which determines which aircraft in the vicinity are targets and send a dispense countermeasure signal to the aircraft.

Nefian; Ara V. U.S. 20040071338 discloses an image processing system useful for facial recognition and security identification obtains an array of observation vectors from a facial image to be identified. A Viterbi algorithm is applied to the observation vectors given the parameters of a hierarchical statistical model for each object, and a face is identified by finding a highest matching score between an observation sequence and the hierarchical statistical model.

MacInnis; Alexander G. U.S. 20030187824 discloses a system and method of data unit management in a decoding system employing a decoding pipeline. Each incoming data unit is assigned a memory element and is stored in the assigned memory element. Each decoding module gets the data to be operated on, as well as the control data, for a given data unit from the assigned memory element. Each decoding module, after performing its decoding operations on the data unit, deposits the newly processed data back into the same memory element. In one embodiment, the assigned memory locations comprise a header portion for holding the control data corresponding to the data unit and a data portion for holding the substantive data of the data unit. The header information is written to the header portion of the assigned memory element once and accessed by the various decoding modules throughout the decoding pipeline as needed. The data portion of memory is used/shared by multiple decoding modules.

SUMMARY OF THE ADVANTAGES OF THE INVENTION

An apparatus consisting of hardware and software for converting input signals from a video camera or sensors into a numerical data in real time, and to minimize time latencies. The derived data provides identification of object, directional as well as rotational parameters of moving objects, in a six degree of freedom.

The apparatus for converts input signals from a video camera or sensors into a numerical data in real time, to detect, identify, and track dynamic moving objects in 3D space. The data will also provide for 3D locations coordinates of each target, and track 3D motion vectors of each individual target. The hardware and software architecture is intended to eliminate time latencies between detection, tracking and reporting of moving multiple targets, moving in a six degree of freedom.

The apparatus utilizes efficient video filtering hardware that identifies individual prime colors of electromagnetic waves, with resolution of the least significant bit of the analog to digital (A/D) converter. The filter also has the capability to filter out unwanted colors including background colors and substituting them with any desired color.

The major difference between this invention and other digital image processing systems is it capability to filter video spectrum pixel colors electronically. The resolution of spectrum color filtering or the number of individual colors to be distinguished and filtered is D to the power of 3, where D is the number of bits in the analog to digital converter used. For instance for a 10 bit A/D converter, it distinguishes (1000*1000*1000) one billion individual colors within the color spectrum. This is a very powerful tool in digital image processing. It eliminates the need for time consuming Fourier Transforms used in almost all image processor hardware of software. The detection time for each one of the prime color pixels are the throughput delays or access time of electronic memory, which are usually in the order of tens of nanoseconds.

Another major advantage of this invention is that does not require computation intensive Fourier Transforms.

Another major difference between this invention and other digital image processing systems is its computer architecture. The architecture is intended to minimize the detection time of multiple moving targets in real time interactive scenario. The architecture is that of a distributed processing, acting similar to an assembly line processor (similar to of a car manufacturing assembly lines) in which processors will work in conjunction with First in First out Memories in between two processors. In order to meet stringent latency time requirement of real time motion detection, the apparatus utilizes special distributed computer hardware that resembles that of a typical assembly line activities. FIFO's are utilized to carry semi-processed data from one processor to another. The FIFO's are also used in a unique manner in which identification of the objects are made much easier. The activity of each individual processor is made simple enough, such that a simple state machine hardware implementation would save time. The processor's individual tasks within the processing line, provides a means to eliminate processing bottlenecks that are common in most of the computer architecture.

Another characteristics of the invention are its capability to measure X, Y, Z distances as well as rotational vector parameters of moving objects. Another characteristic of the invention are its capability to measure rotational parameters of moving objects as well as distance measurements. Another advantage of this invention is its usage of memory for variety of image processing tasks, and avoiding elaborate software programs.

Another advantage of this invention is the use of unique distributed computer architecture similar to car manufacturing assembly lines wherein each computer performs simple image processing tasks by receiving semi processed data from a FIFO, and writing semi processed data to a next FIFO in line. Other benefits of the invention will become evident in detailed description.

BRIEF DESCRIPTION OF DRAWINGS AND FLOW CHARTS

FIG. 1 is the block diagram of the color filter and identifier. It receives video analog signals from a camera or a sensor. It shows two stages in which colors are filtered and identified. The first stage is for identification of prime colors and the second stage is for identification of colors in color spectrum. Number identifies prime colors and spectrum colors. As seen from the block diagram, the output is spectrum color numbers and spectrum color group number.

Figure 3:
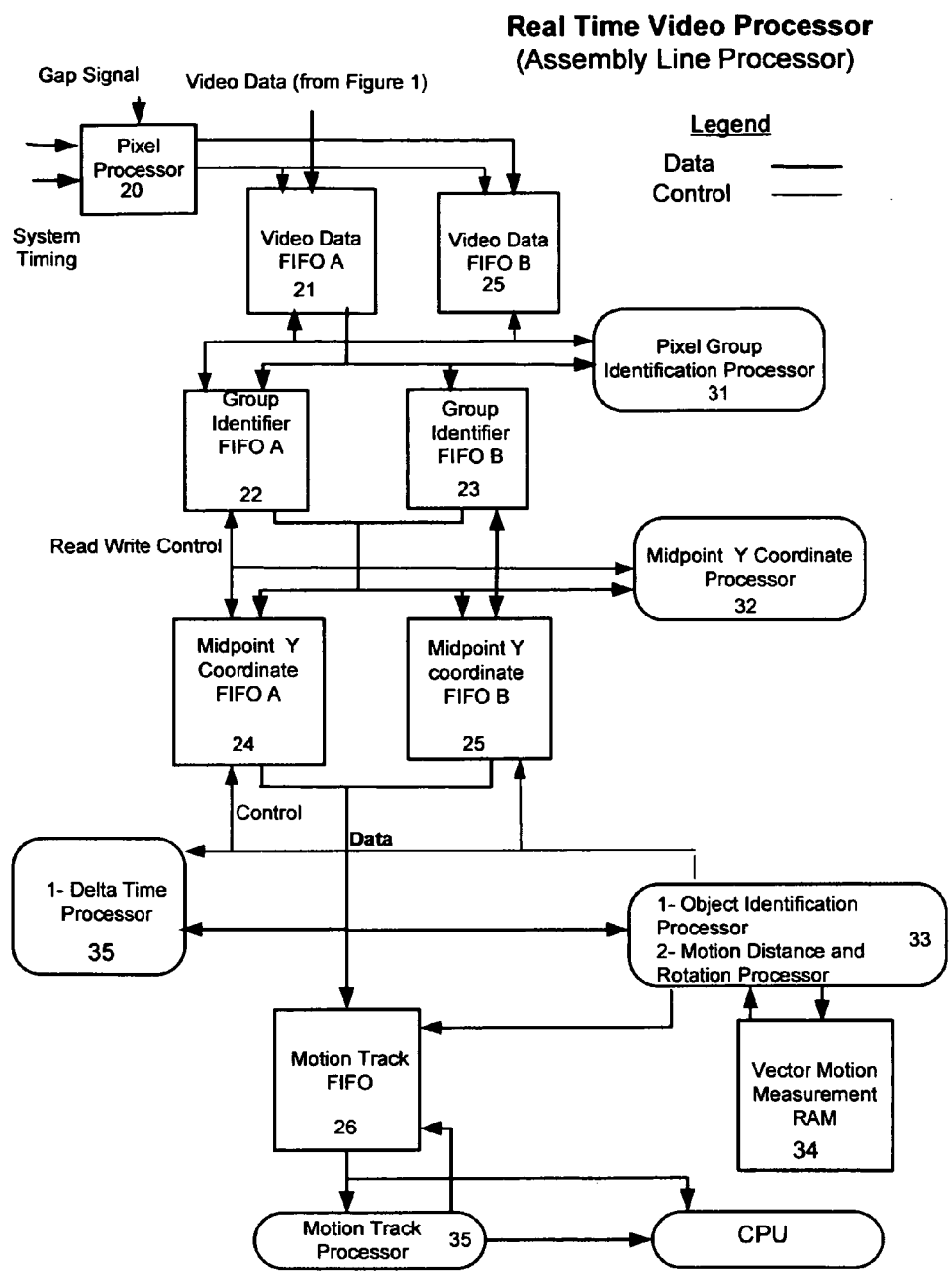

FIG. 3 is block diagram of Real Time Distributed Processor (assembly Line Processor). It receives video data information from the color Filter and Identification block diagram FIG. 1A. It provides Object Identification and motion tracking data of distances and rotational motions of moving objects.

Figure 4:
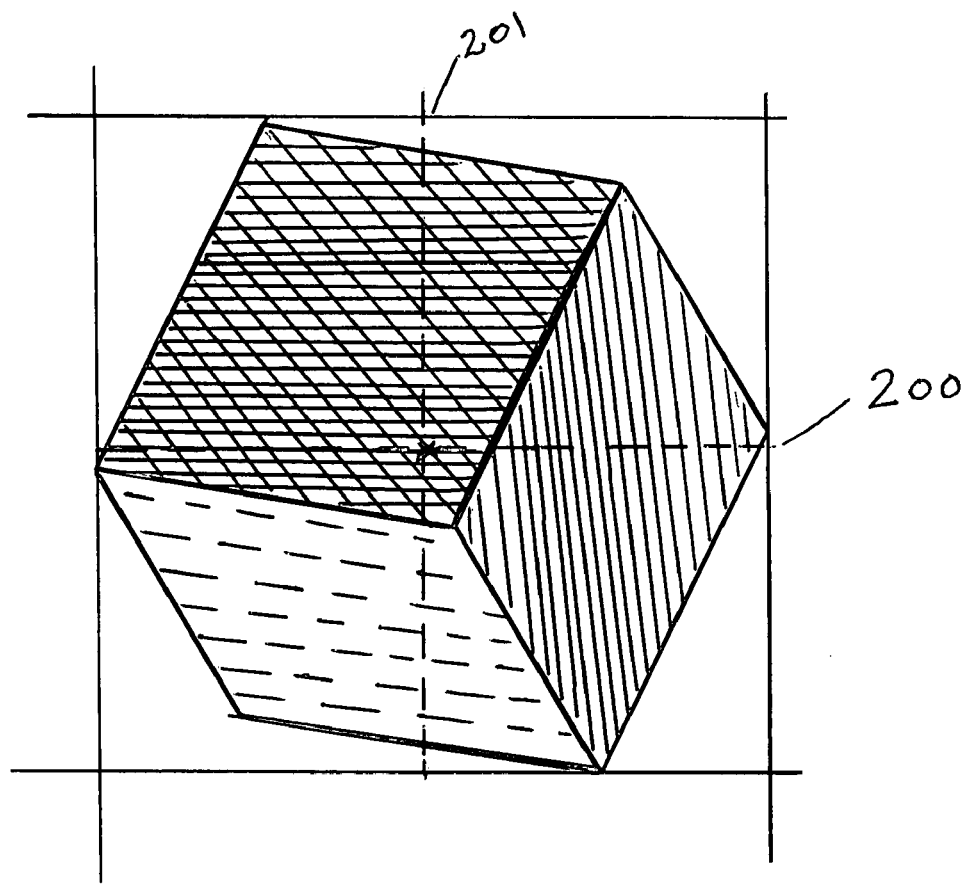

FIG. 4 is drawing of a multicolored cube wherein its midpoints in X, and Y coordinate is shown.

Figure 4A:
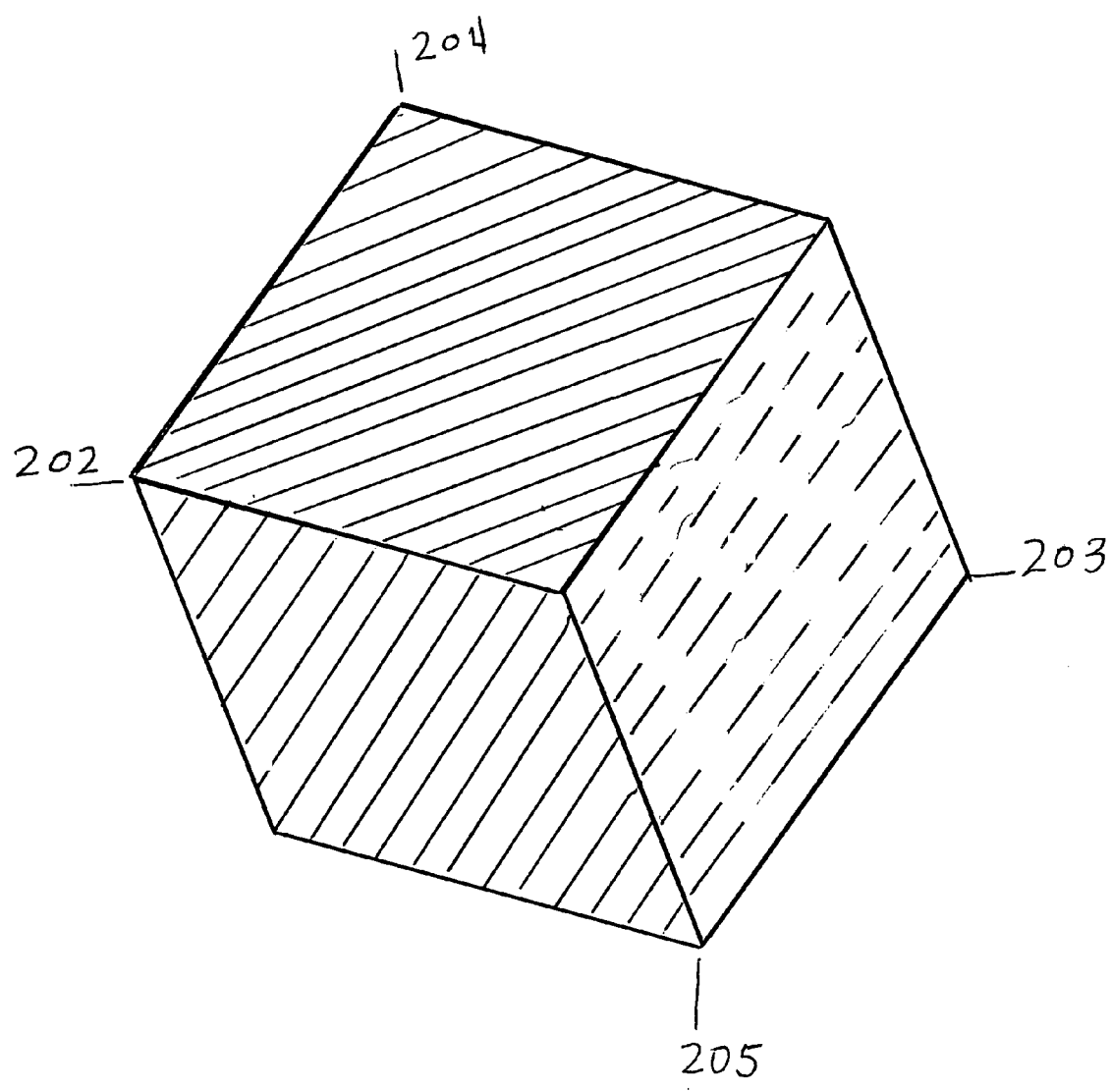

FIG. 4A is drawing of a multicolored cube of FIG. 4 is shown wherein its motion in z axis, and its area of each color covered in X, and Y coordinate is shown.

Figure 5:
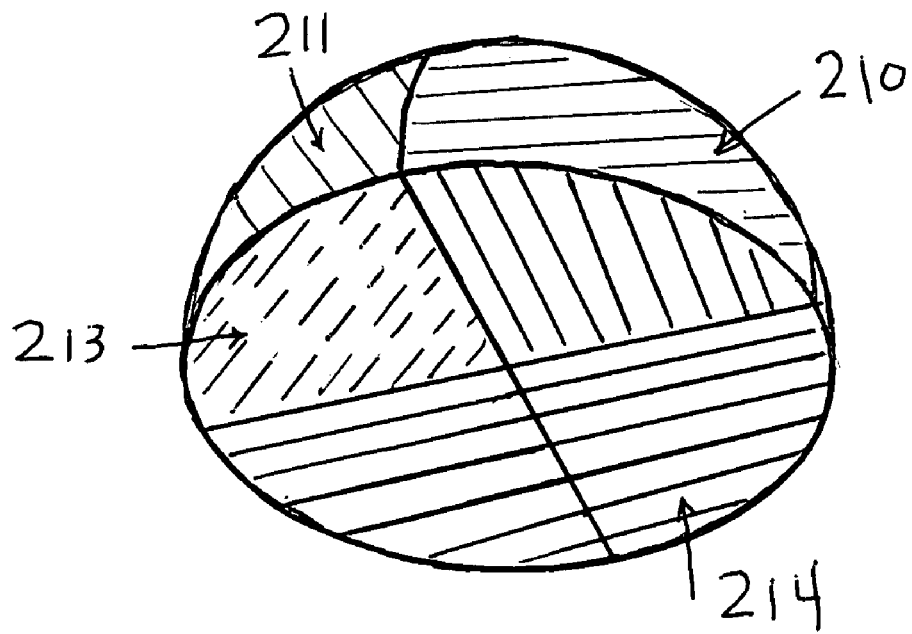

FIG. 5 is drawing of a multicolored half globe wherein its midpoints in X, and Y coordinate is shown.

Figure 2:
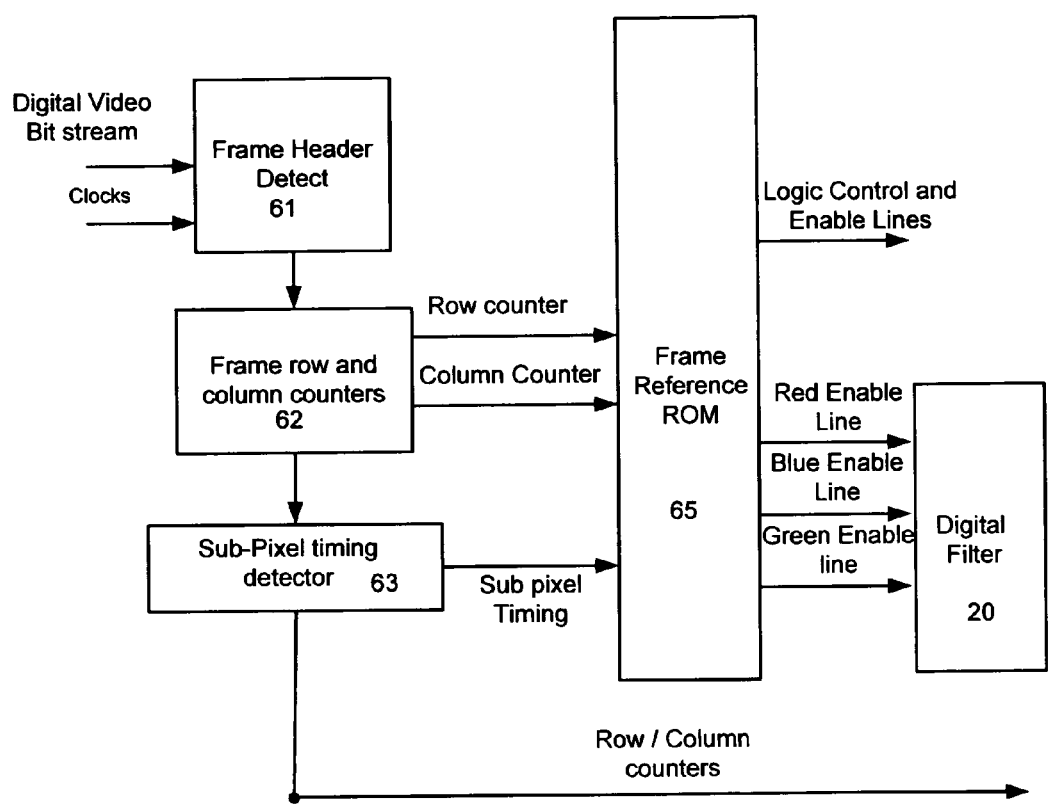
FIG. 2 is the Video Synchronization and Control Logic Block Diagram.
Figure 6:
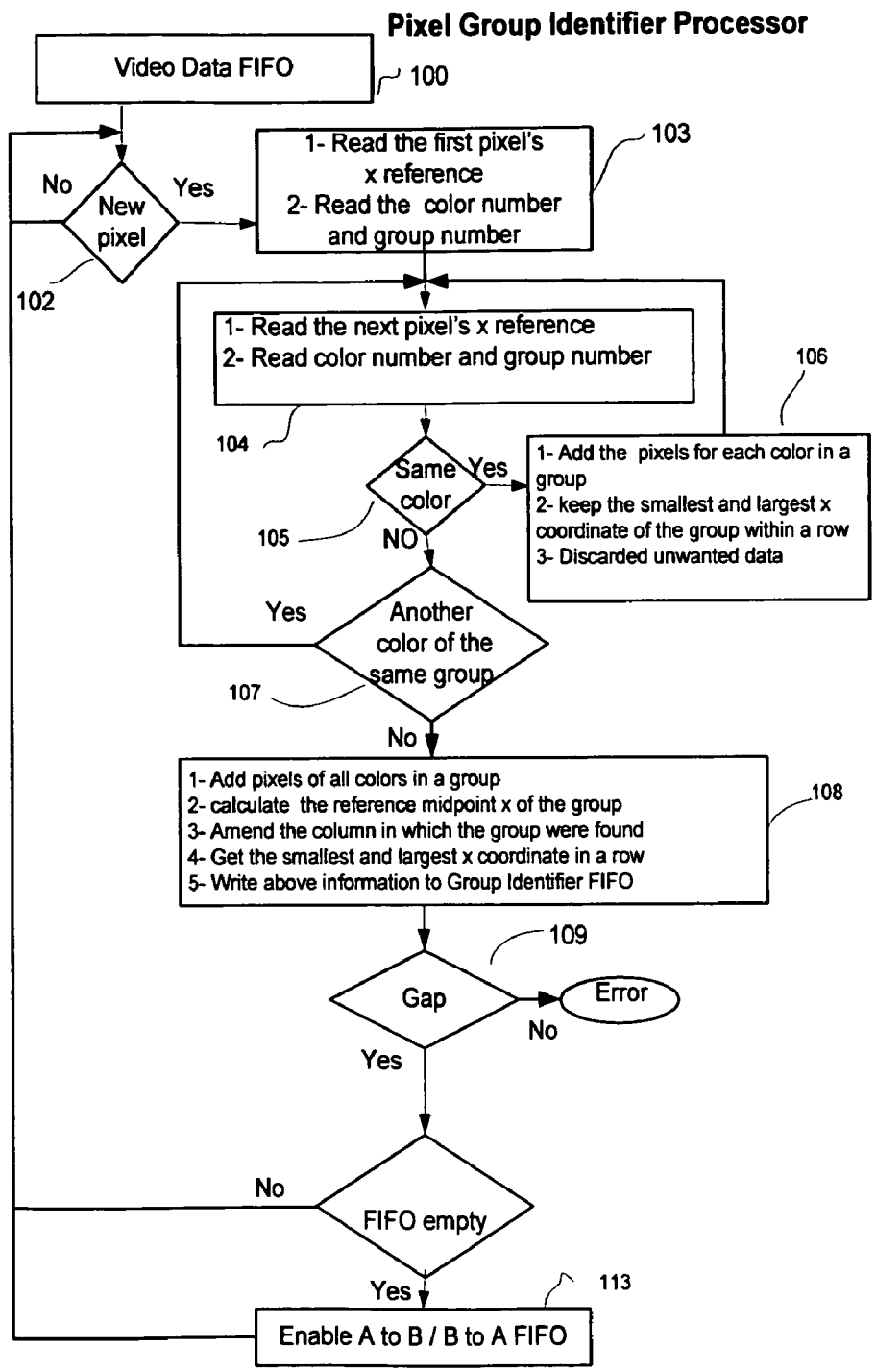

FIG. 6 is the flowchart diagram of one of the Pixel Group Identification Processor part of the distributed processor shown in FIG. 2. The Pixel Group Identifier Processor function is to provide reference x midpoint coordinate of objects necessary for next stage processor, Midpoint x, and y Coordinate Processor.

Figure 6A:
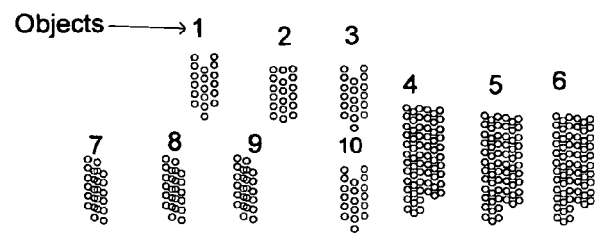
Figure 6A:
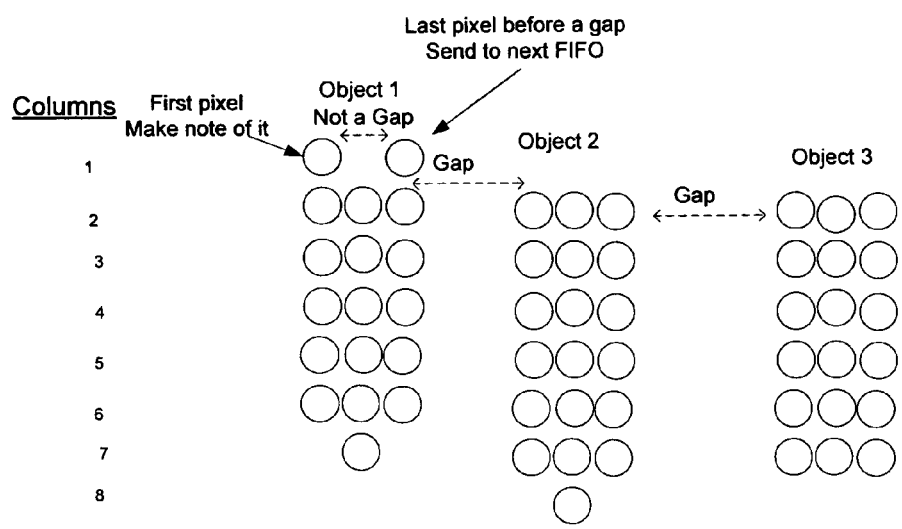

FIG. 6A is a presentation of midpoint x reference data generated by FIG. 6. The presentation is for understanding of the FIG. 6-midpoint reference activities. It shows identified pixels of a group of objects in rows and the definition of Gap.

Figure 7:
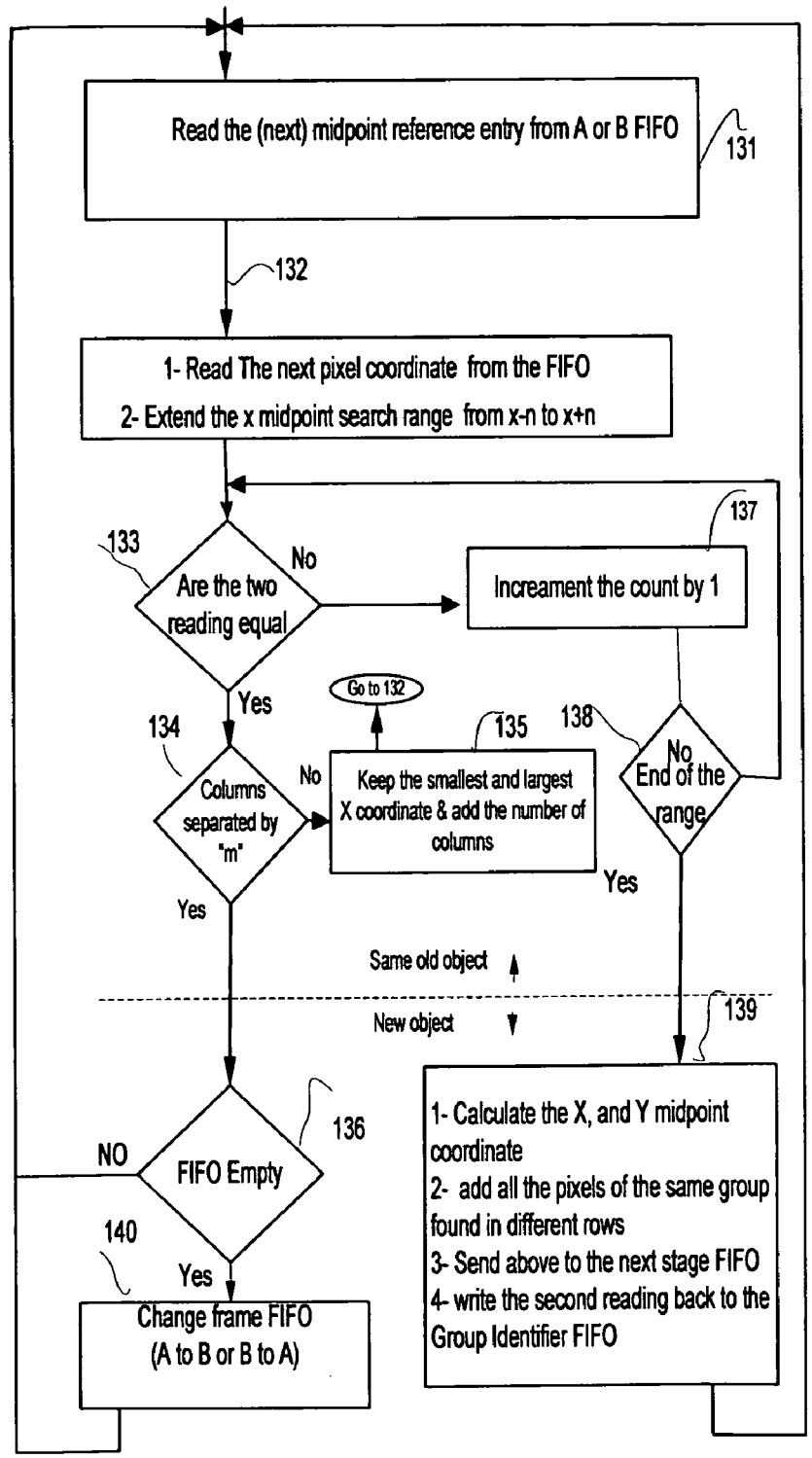

FIG. 7 is the x (row) and y (column) Processor flow chart diagram. Its main function is to sort reference midpoint coordinate of objects based upon the X, and Y, Coordinate references.

Figure 7A:
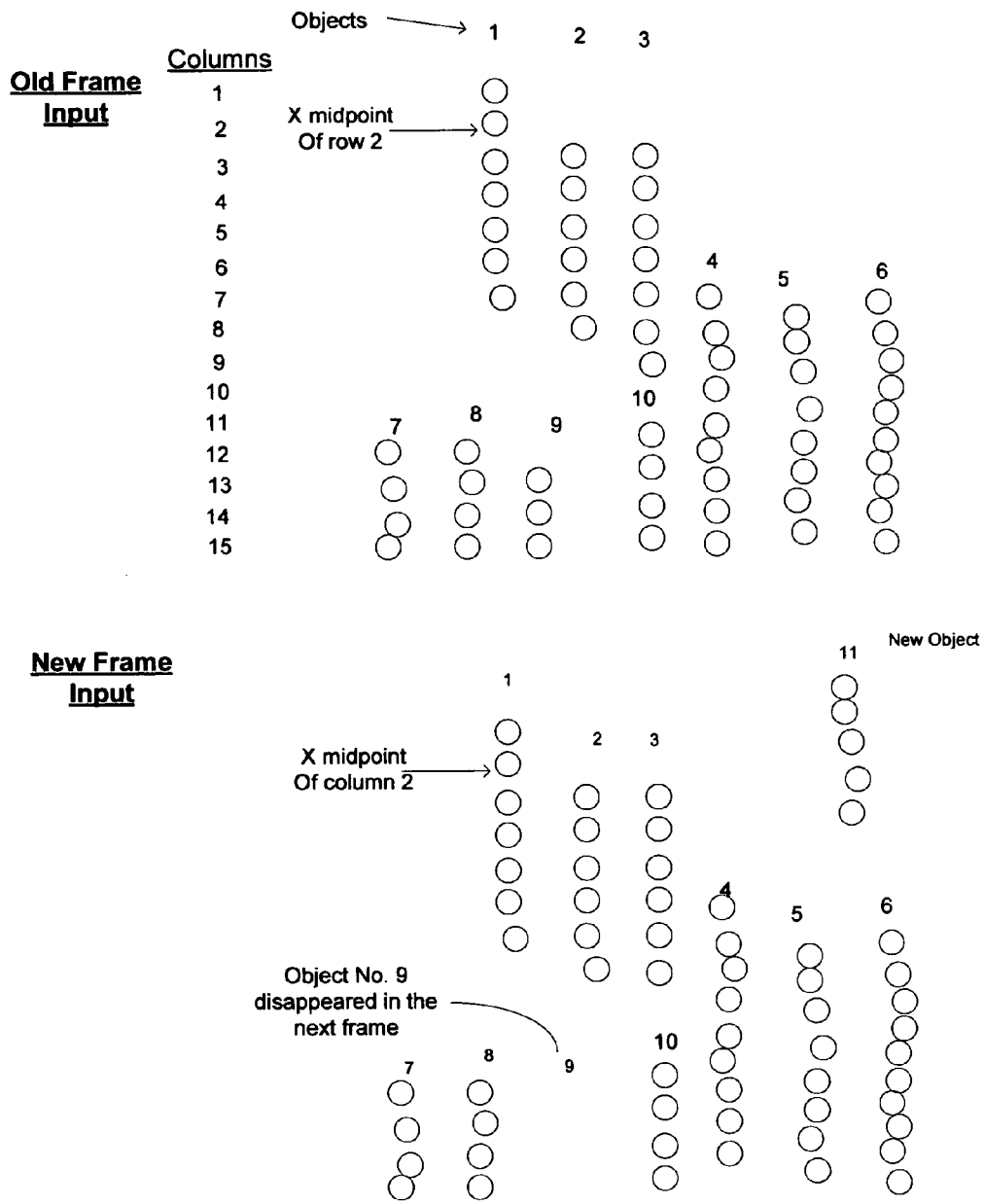

FIG. 7A shows the input to the Midpoint x, and y (column) Coordinate Processor for two consecutive frames.

Figure 7B:
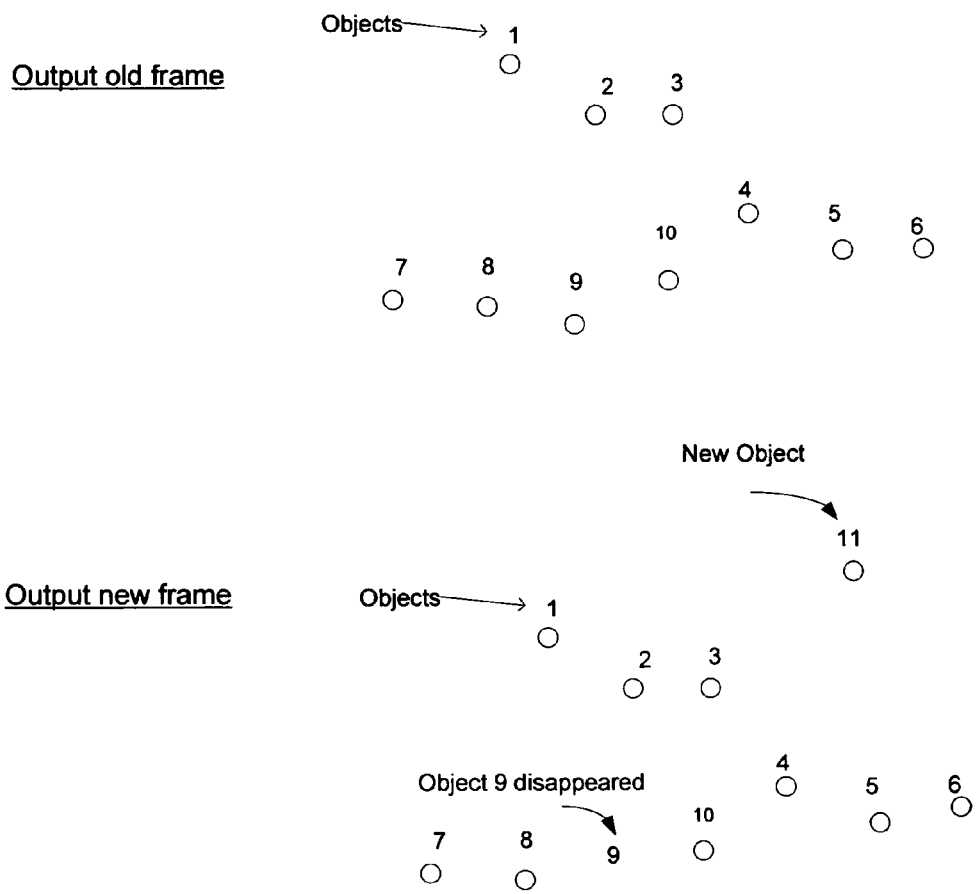

FIG. 7B shows output of the Midpoint x, and y (column) Coordinate Processor for two consecutive frames.

FIG. 7C shows the detailed operation of the Midpoint x, and y (column) Coordinate Processor in which an object is deleted from the previous frame, and another object is added when compared to the previous frame.

Figure 8:
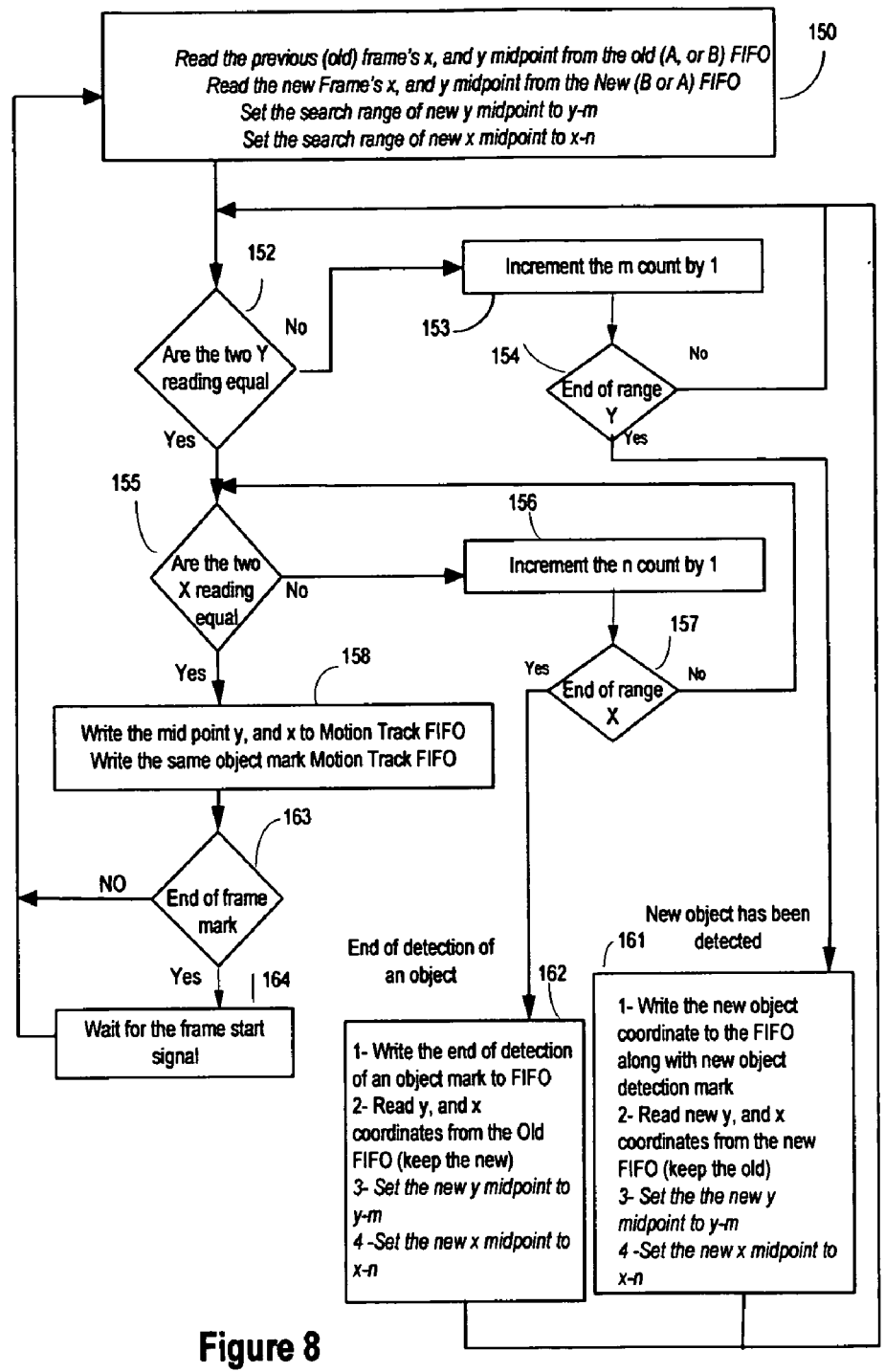

FIG. 8 is the Object Identification Processor flow diagram that identifies objects based upon he emergence on the screen and disappearance.

FIG. 8A is the input to the Object Identification Processor for two consecutive frames.

Figure 9:
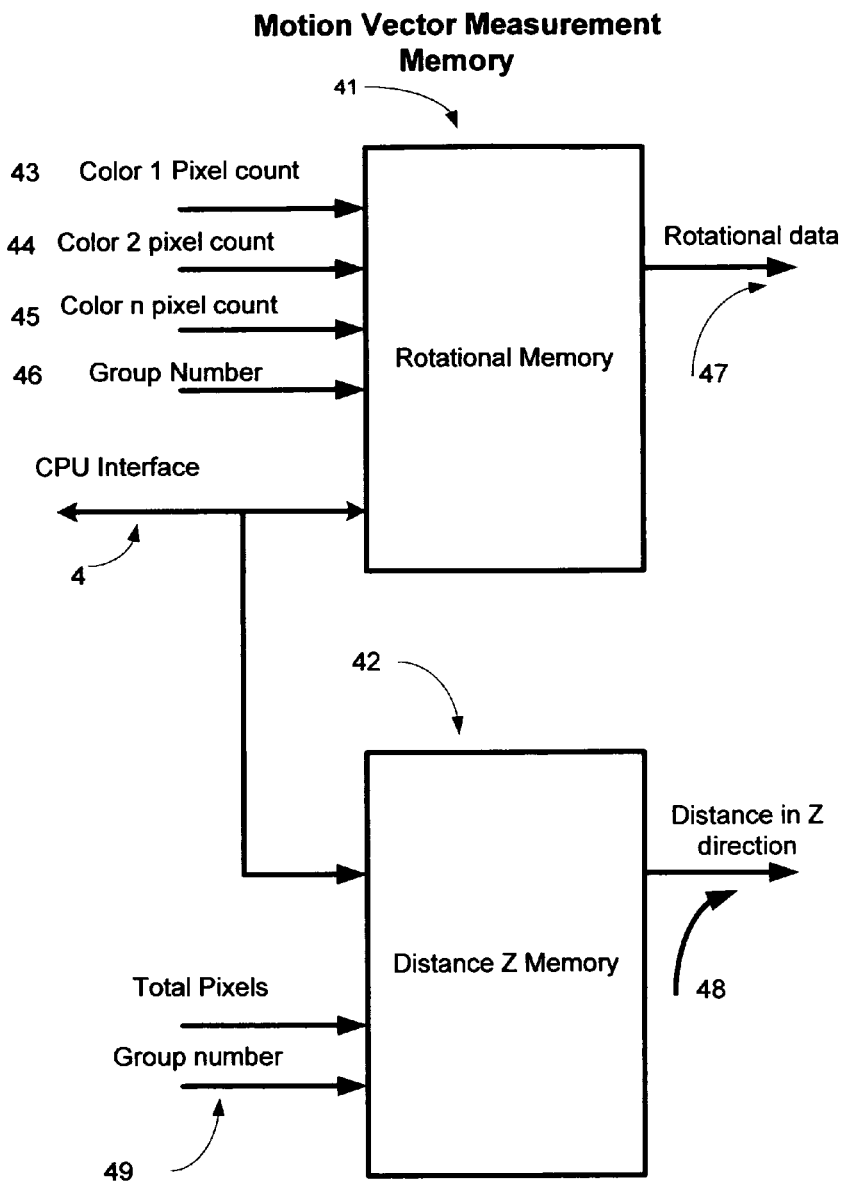

FIG. 9 is the block diagram of the Motion vector Measurement hardware that provides distances as ell as rotational parameter of moving objects.

DETAILED DESCRIPTION OF THE INVENTION

Those having ordinary skills in the art may be able to make alterations and modifications what is described herein without departing from its spirit and scope. Therefore, it should be understood that what is illustrated is set forth only for the purposes of example and that it should not taken as a limitation in scope of the present apparatus and method of use.

The above-described drawing figures illustrate the described apparatus and its method of use in at least one of its preferred, best mode embodiment, which is further defined in detail in the following description.

An apparatus consisting of hardware and software for converting input signals from a video camera or sensors into a numerical data representing motion characteristics of multiple moving targets, with minimal latencies. The data provides identification of objects, distances (X, Y, Z) as well as rotational parameters of moving objects, in a six degree of freedom. The apparatus consists of an efficient video filtering technique that identifies each individual prime colors of electromagnetic waves and color spectrum with the resolution of the relevant A/D converter to the power of three. The filter has the capability to filter out unwanted colors including background colors and substituting any desired color for transmission.

In order to meet stringent latency time requirement of real time motion detection, the apparatus consists of a special distributed processing computer hardware that resembles a typical assembly line activities. FIFO's are utilized to carry semi-processed data from one processor to another. The FIFO's are also used in a unique manner in which identification of the objects are made much easier. The activity of each individual processor is made simple enough, such that a state machine controller/processor hardware implementation would replaces typical CPU's. The individual processor's tasks in conjunction with use of FIFO's, provides a means to eliminate bottlenecks that are common in most of the distributed processor computer architectures.

Figure 1:
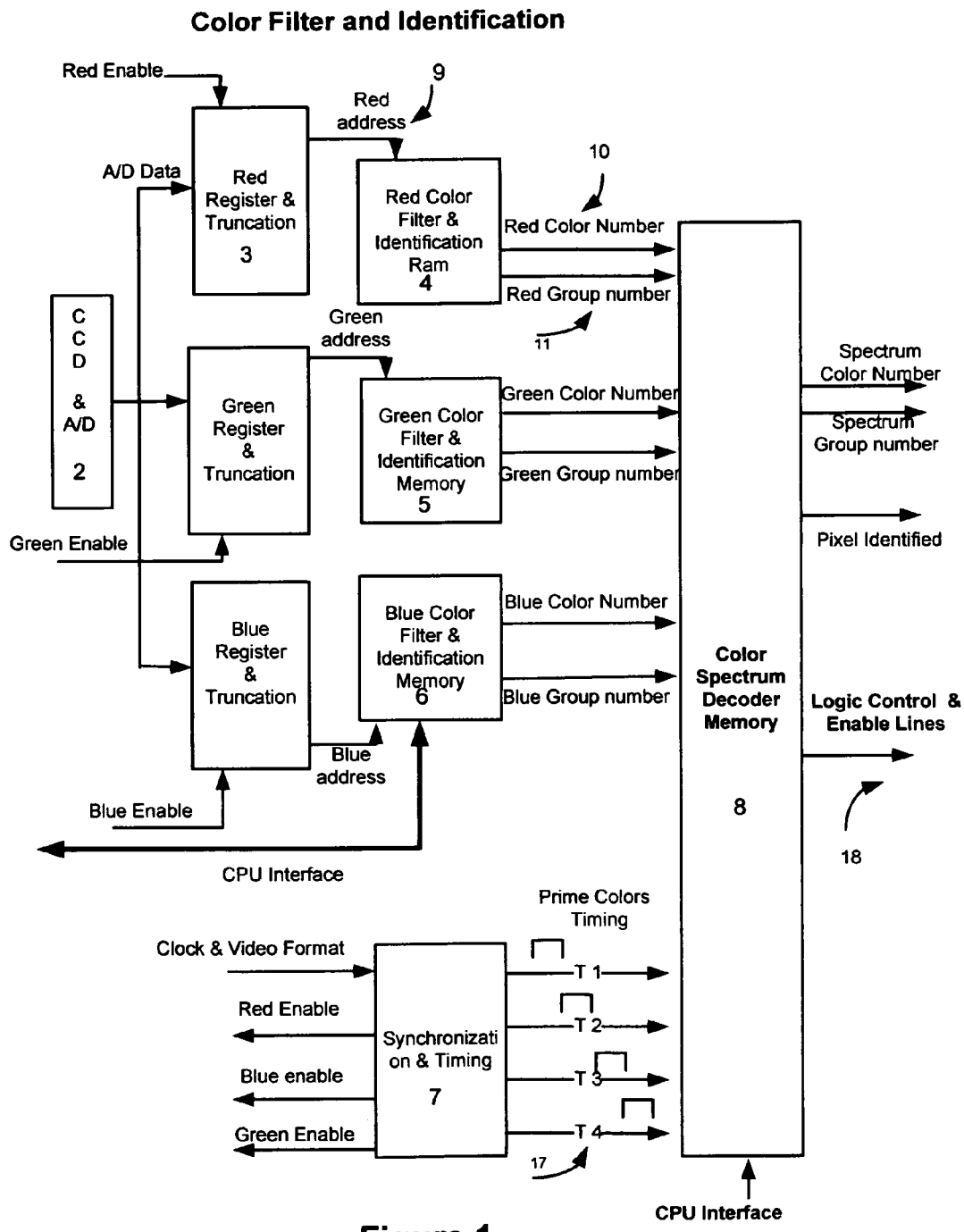

Prime Color Filtering and Identification (FIG. 1)

Referring now to the block diagram of FIG. 1, we find at point 2 (block 2) that the analog video data from either a camera or a CCD, is converted to digital. At point 7, the known format of the video data is used to synchronize with the incoming video signal. Upon synchronization the signals of the prime color 14, and their associated timing within a pixel time, 17 is generated. The prime color timing and color identification is used to clock the prime color data intensities into an appropriate holding and truncation registers 3.

At points 4, 5 and 6, the digital prime color intensities are set as an address to an appropriate prime color memory. The memory contains the prime color filtering and bandwidth information for each prime color, which has been pre-recorded by the CPU. The pre-recorded data of the memory is organized to identify prime color numbers, and prime color's group number.

Along with identification of the prime color number, the pre-recorded data of the memory also identifies the particular group of any other prime colors. The groupings can be from 1 to m, where m is the total number of groups of colors of different objects.

Along with the identification data, and grouping, the memory will indicate if that prime color is to be replaced with another prime color, and provides the desired intensities to be replaced with the detected intensity. Therefore the content of memory can contain pre-recorded information such as:
Identification,
Prime color number,
Group number,
Substitution,
Substituting color intensity Spectrum Color Filtering and Identification (FIG. 1)

Referring again to FIG. 1, the prime color numbers of all prime colors (10), and their associated group numbers (11) are set to a color spectrum memory to identify color numbers within the color spectrum.

During each pixel time period, the prime color numbers from all three of prime color memories, are set as an address to a Color Spectrum Memory, wherein the data of the memory, indicates identification, selected color number, selected color group, center of the filter, bandwidth of each color, if it is greater than, less than, or equal to a center of the color within a group of colors in the color spectrum;

The number of locations of the address in which the color is to be filtered decides a bandwidth of a color and its group identification.

The Color Spectrum Memory Filter also contains substitution of any incoming color with another color to be transmitted.

By adding the pixel timing all digital control information needed for the digital implementation of the design is introduced. This will be used to control all other digital logic for the rest of the design such as video output flow control.

Identification is made by reading a "0" or a "1" from the data of the memory. A "0" represents the prime color is not identified and "1" represent the prime colors intensity is identified. The memory also contains prerecorded number associated with that particular prime color intensity. Identified prime colors point 10, are numbered from 1 to n, where n is total filtered prime color number.

Video Synchronization and Control Logic FIG. 2

FIG. 2 is the expansion of the block 7 in FIG. 1. It includes the video frame header detection 61, frame's row and column counters 62, sub pixel timing counter 63 that are input to the frame reference ROM 65 to provide pixel prime color designation timing to filter apparatus 20 and other logical controls.

Distributed Assembly Line Processor (FIG. 3)

FIG. 3 is the architectural block diagram of a distributed processor for time critical digital image processing. Since the architecture of this distributed processor, resembles that of a typical assembly line, it is called, a Distributed Assembly Line Processor.

The goal of each process in the Assembly Line Processing is to partially process data for the next processor in line and eliminate the redundant data. The operation of one processor is dependent upon the previous processor. Each processor reads the previous stage FIFO's relevant data and upon further processing writes the relevant data to the next FIFO in line. The process is summarized as follows:

Process to take place continuously in consecutive order, wherein processing tasks are divided into plurality of simple tasks that are time dependent as well as functional dependence.

The pre-processor (s) of each FIFO process and load the semi-processed data into the first stage FIFO.

The post-processor of each FIFO read the semi-processed data from that FIFO and after further processing write it into the next stage FIFO.

Referring now to block diagram of FIG. 3, we find at point 20, the Pixel Processor interfaces with Color Spectrum Filter and both Video Data FIFO A, and Video Data FIFO B. Filtered and identified pixels, are red from the Spectrum Filter memory and then loaded to one of the FIFO's.

Figure 2A:
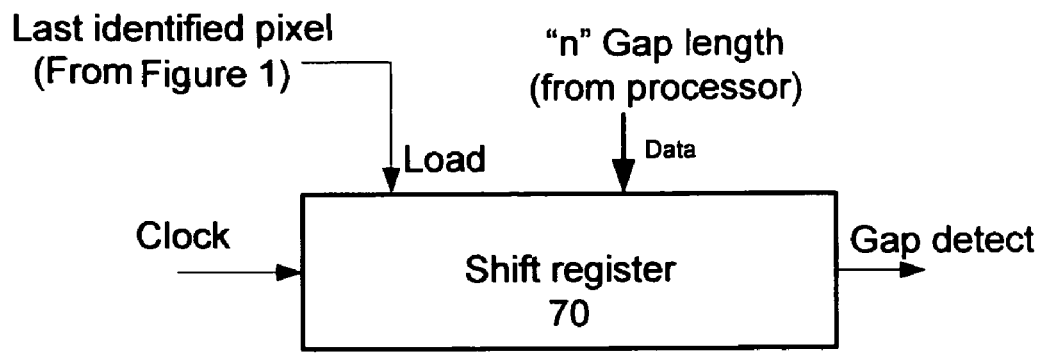
FIG. 2A is the hardware method in which a gap is detected to distinguish one object from another.

It also interfaces with Video Synchronization and Control Logic to read relevant frame timing to write it to the Video Data FIFO's. It is also interfaced to Gap signal (FIG. 2A) to receive a Gap signal from the Gap Detector Hardware to amends a gap mark and announce the end of detection of group of colored pixels within a row. The Assembly Line Processor's individual processors will process the pixels based upon their color and group identifications, and then start processing and identification of colors and objects based upon their x, and y frame location coordinates in which they were found. The order of coordinates of each pixel are characterized by column first and row second.

The definition of tasks and functions of each processor and FIFO will become clear in the following sections.

Utilization of FIFO's provide the advantage for the each processor to read and write data in only two addresses, thus saving time in updating pointers for data read and data write.

Since the functions of each processor is kept to a minimum, a memory based state machine logic that changes modes of operation within one clock period time, compared with memory based CPU's. that take many clocks to complete an instruction set.

Gap Detection (FIG. 2A) (Note was FIG. 3)

In his invention, an object is considered to be separated from another object, if there is a "n" number of consecutive undetected pixels of a color (s) in a row, and "m" consecutive columns of undetected (same color'(s)) number, in between colored objects. In this application we call this separation, a gap. The gap is absent of a specified color pixel in a row and columns from another specified color pixel or the same color pixel in the same row. During detection, if there are no gap between one color belonging to a group of colors and another color of different group of colors, a separation and identification of two objects are declared.

Two dimensional detection of object moving in a three dimensional space are assumed to be in the vicinity of the same location initially detected for a given frame rate;

Referring again to FIG. 2A, the shift register is loaded with "n" and it loads the shift register whenever an identification of signal is received from Spectrum Color Memory. As long as there are consecutive detected pixels in a row, the gap detect signal will remain low, but when the "n" number of undetected signal reaches, this signal will go High indicating a separation two objects.

Motion Characteristics of an Object (FIGS. 4, 4A, and 5) Moving in a Three Dimensional Space The x, and y midpoint position of an object moving in a three-dimensional space is its two-dimensional focal plane midpoint "x" (row), and its midpoint "y" (column) captured by sensors of a camera. The midpoint X coordinate of a multicolor device is the midpoint between the smallest (FIG. 4A point 202) and largest pixel x coordinates of any one of its colors detected in any row (FIG. 4A point 203). The midpoint Y coordinates of a multicolor object is the midpoint row, between the first to the last row in which any one of its colors is detected (FIG. 4A, points 204, and 205).

Referring now to diagram of FIG. 4, we find the approximate midpoint coordinate of a multicolored cube, is the point where two lines (200), and (201) intersect each other Point 209.

FIG. 4A is another drawing of FIG. 4, wherein the distances as well as angles are changed from frame to frame, compared to FIG. 4. Point (202) is the minimum x, (the smallest x coordinate pixel in which the object was detected) and (203) is the maximum x coordinates. Point (204) is the first row in which the cube has been detected (minimum y), and point (205) is the detection of the objects is ended (maximum y).

FIG. 5 is a rendition of a half globe, wherein the midpoint coordinates are identified. Points (210, 211, 213, and 214) are the area of each color is detected in an X, and Y plane. The area under each color is the total pixel count of that color. Points (210, 211, 213, and 214) are the derived by counting the same colored pixels detected in one particular frame.

Filter Processor

The Filter Processor coupled to the Color Spectrum Filter, reads pixel information from the color spectrum memory whenever the "pixel detect mark" appears at the output of the spectrum color filter (at appropriate pixel timing), to denote the detection of a pixel color during that pixel timing and provides the following to Video Data FIFO:

a) The filtered color pixel data.
  The multicolored object's spectrum identity number.
  The group number (of colors) belonging to an object.
b) The pixel coordinates with respect to pixel position number within a row and column in which they were found.
c) The pixel gaps detect.

Pixel Group Identifier Processor (FIG. 6)

At point (106), the algorithm also checks for and retains the smallest and the largest x coordinates (of any color in a group in a row). This measurement is later used to find the midpoint coordinate of an object in following columns.

The pixel Group Identifier Processor receives filtered color pixels, and related group number from Video Data FIFO.

FIG. 6 represents the flow chart activities of the Pixel Group Identifier Processor. Its job function is to identify color, and groups of colors belonging to an object within a row. It then provides the midpoint reference location of a group of colors in which they were found in a row of a frame. FIG. 6A provide more detail representation of the input to the Pixel Group Identifier Processor.

This reference midpoint x is only for location identification of a group of color pixels in a row that have the same color and belong to a group of colors. Actual midpoint x identification takes place in the next stage of processing.

Referring now to the numerical logic numbers in logic flow diagram of FIG. 6, in conjunction with FIG. 6A, we find:

At point (100) the color filter and identification output of FIG. 1 that is stored in the Video Data FIFO and is the input to Pixel Group Identifier Processor.

At point (102) it receives newly identified pixel (This is the first detection of a color of an object and it starts from a new row or a new object after a gap).

At point (103) it retains the first reference midpoint x coordinate of a group of pixels, its color, and color group number. It uses the color information and midpoint x (row) reference location as a basis of comparison with the next pixel.

At point (104), it goes on to read a new pixel reference, as well as color number and group number again.

At point (105), it checks the color and group number to be the same as point (103).

Note:

Since the pixels of a multicolored object are consecutive in a frame, only the colors related to a group of colors should be detected before a gap.

At point (106), if the new pixel is the same as previously identified color (point 103), it adds the number of detected pixels (in a row) belonging to the same color of the group.

The area under each color of an object is needed to detect it rotational vectors. The total area under all colors of an object represents it closeness to the detector. This is explained in Motion vector Measurement memory to follow.

At point (106), the algorithm also checks for and retains the smallest and the largest x coordinates (of any color in a group in a row). This measurement is later used to find the midpoint coordinate of an object in following columns.

At point (107), it checks to make sure that the detected color belongs to the group of colors associated with an object. This is a double check, in addition to the filter group checking and identification of colors in FIG. 1. If it is the color of the same group, it goes back to point (104) to get the next pixel, and group's color number.

Point (108) is reached when different group of colors are detected. It does the following:
Add the total pixel counts of the all colors in a group.
Retains the smallest and the largest x coordinates of a group colors in a row.
Retains the row number.
Sends above information to the next stage FIFO.

When the end of an object is detected (FIG. 3), the gap signal mark is amended to the previously detected pixels, to inform this processor that a gap was detected upon interruption in the detection of any color related to a group of colors.

Note:
If the new detected pixel color is different (does not belong to the same group), it is assumed that a color in a different group of colors is detected (This is the same as detection of a different object).

At point (109), it checks for a gap tag that was amended by FIG. 3. If there is gap, it assumes correct spacing, if there is no gap found, it provides an error signal.

At point (111) it checks for the last column in a frame. If it is, it changes the order of the next stage old and new FIFO's (A to B, or B to A).

This process eliminates the amount of date in between the smallest and the largest X coordinates in a row.

Referring now to the pixel grouping that is input to the Pixel Group Identifier Processor in a manner in which an object appears on the CCD camera. The object numbers appear on the drawing are for the reference and understanding of the future data processing only of next logic diagrams. At this point the processor does not know anything about the emergence and disappearance of the object. The Object Identification Processor part of the distributed processor performs object identification.

FIG. 6A illustrates the concept of group of colors that appear on the CCD, and the concept of Gap between two objects.

The method in which the Pixel Group Processor reads data from the FIFO is in a manner in which a pixel is detected in any row to the end of a row and then from the next.

The output of the Pixel Group Identifier Processor, is illustrated in FIG. 7A for to consecutive frames.

Midpoint X & Y Coordinate Processor (FIG. 7)

The X (row) and Y (column) Coordinate Processor reads the reference midpoint coordinates from the Group Identifier FIFO, and sorts them with respect to their relative location coordinates.

During this process, it checks for the relative position of each midpoint to ensure that they are related to the same group of colors.

Referring now to the numerical logic numbers in logic flow diagram of FIG. 7 in conjunction with FIGS. 7A, 7B, and 7C:

At point 131, it looks for the first midpoint entry and keeps it to check other entries that are closely related to the first coordinate reading.

At point (132), it reads the next entry, and in order to check its position with the first entry, it extends the search range of second reading by few +/−n pixels.

At point 133, it starts from the lowest extended number and checks it against the first entry it received in point 131. If the midpoints are close to each other within +/−n pixel locations, and close to each other within "m" number of columns (point 134), it transitions to point 135.

At point 135, if there is a mach for the two entries, and they are with "m" number of columns, it adds to the number of columns, and retains the lowest and highest midpoint X coordinates.

Since the order of the received midpoint reference coordinate is that the Pixel Identifier processor starts from the first to the end of the row looking for the reference midpoint and repeats it again for the remaining of the rows, there is a correlation between the data and the object within the same frame. For continence, a number is assigned for each group of midpoint x. The numbers are based upon the first group and the last group of the x midpoints FIGS. 4, 4A, and 5.

At point (135), if the reference x coordinates are separated by "m" number of columns, it considers it a new object having the same midpoint reference x coordinates and transitions to point (132) to look for the next entry.

At point (136), it checks the end of the list and if it is the end, it changes the order of net FIFO's and goes back to point (130), for the start of the next frame.

AT point (138), if at the end of the range of +/−n, there is no match between the two midpoint reference x's coordinate readings; it indicates that, the second reading belongs to different object and transitions to point (139).

Point (139) it assumes that the midpoint coordinate x identification has ended. It then calculates the real midpoint X coordinate and midpoint Y coordinate of the object and it sends the result to next stage FIFO. It also marks the second reading as the first and it transitions to point (132), to look for match of the second object.

The X, and Y coordinate processor, reduces the amount of data in between rows belonging to a group of colors (object).

FIG. 7A is the illustration of the pixel grouping within a row followed by the next row (next Column) for two frames. It indicates the emergence of a new and disappearance of object that are input to the X, and Y Coordinate Processor.

FIG. 7B is the presentation of the result of the processing by the X, and Y Coordinate Processor in which each object is represented by a point that is the midpoint x, and midpoint y of an object with a frame reference of coordinates.

Object Identification Processor (FIG. 8)

The Object Identification Processor reads X, and Y midpoint coordinates information from the X, and Y Coordinate FIFO. It essentially compares the coordinates from new FIFO (new frame) to the old FIFO (old frame) and makes a decision if the new coordinates in the new frame, is equal to the old frame, smaller than the old or larger the old. In summary, the following activities are related to this processor:

The activities of the Object Identification Processor is made easy by taking advantage of the FIFO's way of operation. In summary, the operation of this processor is summarized as follows:
Read the old midpoint x, and y from the old (A or B) FIFO.
Read the new midpoint x, and y from the new (B or A) FIFO.
Provide a tolerance of "m" for the row coordinate and tolerance of "n" for the x coordinate
By comparison of old and new coordinate, identify an abject.
Write the above result along with the associated pixel numbers to the Motion Track Processor.

Since the comparison is made between two frame, a third FIFO is added to the circuit to prevent the mixing of old and new data.

Referring now to the numerical logic numbers in logic flow diagram of FIG. 8, at point (150), the processor starts with the new Y coordinates, developed in the previous process, and after extending the search range of the new row coordinate by +/−m, it starts comparison of the rows. Search range +/−m is to make sure that small motion changes from one frame to another frame are accounted for.

At point (152), if the comparison is not made, it will increase the range of search by one, and transition to point 154 wherein if it is not the end of y coordinate search range; it will go back to point 152.

If there is a match at point 152, it will transition to point 155 wherein it will look for the mach pf x coordinates within +/−n counts. If thee is a match between the old x coordinates at point 155, it will indicate that same object was detected again in the new frame. It then does the following:

Write the midpoint of the same object to the Motion Track FIFO.
Write the same object mark to the Motion Track FIFO.

At point (154), if the same y coordinates in old and new has not been detected within the range of m, it indicates that the new y coordinate is smaller than the old y coordinates. The analysis of FIG. 7C indicates that this is the emergence of a new object and the transition to point 161 to perform the following:

Write the new object's x, and y coordinate to the Motion Track FIFO along with the new object mark.
Read the new x, and y coordinate from FIFO and set the search range of y to y-m, and x to y-n.
Keep the old frame's x, and v coordinate and transition to point 152.

At point 157, if the same x coordinates in old and new has not been detected within the range of n, it indicates that the new x, and y coordinate is larger than the old coordinates. The analysis of FIG. 7C indicates that this is the disappearance of an old object and transition to point 162 to perform the following:

Write the end of detection of an object mark to the Motion.
Read the x, and y coordinate from the old FIFO.
Keep the new x, and y coordinates and the search range of the new y to y-m, and x to y-n.
Transition to point 152.

Motion Vector Measurement Memory (FIG. 9)

Multicolored three dimensional objects moving in a three dimensional space, will provide an instantaneous vector measurement of distances x, y, and z as well as rotational values related to motions of the object in a six degree of freedom as follows:

a) Multicolored objects moving in a three dimensional space, when detected by a camera, will register a unique signature of different color areas in each frame, wherein, the areas under each color of all the colors in a group of predefined colors, will represent a unique instantaneous angles of rotation in a three dimensional space and the total areas of different colors, provide an instantaneous magnitude of distance in z direction.

b) The relative value of the three rotational positions of an object in motion is obtained by setting the area for each color of related colors and color numbers, as an address to a memory wherein the data for the three angular positions have already been registered during calibration.

During the real time motion detection and processing, the area count of all color portion including their associated color numbers are organized as the address to the memory and corresponding previously measured absolute value of z and three angular dimensions are red as the data.

c) Measurements of instantaneous angular positions and instantaneous location in z direction in any set of multicolor object are the result of comparison of instantaneous measurements to the empirical measurements performed during calibration.

d) The surface area of each color is measured by counting the number of pixels of that particular color in a set of colors detected in a frame real time motion detections.

e) Calibration of values of motion in z direction and the three instantaneous angular motion values are the result of empirical measurement of the area under the each color and recording known vector motion values in a memory addressed by each color number and detected area of each relevant colors.

f) The calibrated instantaneous value of z, and x, y, and z rotational vectors are recorded in a memory, while the address to the memory is the area under each particular color and the detected assigned color numbers.

g) The previous process (e) is facilitated by motion simulation of the multi colored object during motion and pixel measurements of different colored areas related to each motion in a frame.

h) If the rotational values are small, the change of motion in z direction is approximated by the ratios of past and resent detected value of total relevant color areas.

i) Tracking is performed by using the above x, and y instantaneous measurements of a multicolored object and tow dimensional rotation of a gimbals, wherein the camera is mounted on.

j) Using above information, optical or pixel zooming is made possible.

Referring now to the numerical numbers in FIG. 9, The Rotational Motion Detector Memory (41) receives each group's individual total number of pixels of each color of an object (43, 45, 46) along with the associated group number from the Object Identification Processor. It sets this information along with spectrum identification number as an address to the Rotational Vector Motion Measurement Memory and receives three dimensional rotational values (47), as well as motion in Z direction (48), of an object. FIGS. (4, 4A, and 5) show the motions of a multicolored cube and a half globe, moving in a three dimensional space.

Motion Change Detector Processor

The motion change detector processor receives the rotational x, y, and z vectors and Z coordinates values from the Vector Measurement Ram. It also calculates their associated elapsed time from this frame to previous frame of each object. It calculates the velocities and acceleration of each object from this measurement to previous frame measurement. Elapsed time is calculated a follows:

Elapsed time between the detections in two frames is the midpoint in time of this frame detection to the midpoint in time of the previous frame detection.
Midpoint time is the time difference between the first row to the last row in a frame in which the detection took place divided by two.

The vector velocities are derived by the changes in vector measurements during two frames divided by the elapsed time. This information is passed to the Motion Track FIFO.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An apparatus for performing digital video filtering of a sequence of raster input pixel signals, each respective raster input pixel having, an ordered n-tuple set of values from a video camera or sensors to signify n-tuple color identification of a pixel, the apparatus consisting of the following:
   a) a digital video synchronization and timing controller that synchronizes to the header of the incoming digital video data bit stream and provides digital timing and control signal required to identify each one of the "n" tuple set of prime colors, and position of each prime color within a pixel timing;
   a) a prime color digital filter, coupled to receive the intensities of the n-topple sequence of raster input prime signals and map each respective n-topple prime color intensity into a respective prime color memory address each memory address having:
      a respective memory address within
      a predetermined memory address range,
      each predetermined memory address range identifies each prime color of n-tuple input of a multicolored object within as,
      a multicolored prime identity number of,
      a group of colors belonging to an object within as;
      a multicolored object's group identity number;
   each memory address identifies prime colors of a multicolored object within a group of colors belonging to an object, and within different groups of multicolored objects;
   b) a spectrum color digital filter, coupled to receive the multicolored object's prime color identity number of, the group of colors belonging to a multicolored object, as an input to a memory address each memory address having:
      a respective memory address within
      a predetermined memory address range,
      each predetermined memory address range identifies each color of n-tuple input of a multicolored object within as,
      a multicolored identity number of,
      a group of colors belonging to an object within as;
      a multicolored object's group identity number;
      a color identification mark, to denote detection of color within a spectrum of colors;
   each memory address identifies each color of a multicolored object in the color spectrum within a group of colors belonging to an object, and within different groups of multicolored objects.

2. Apparatus of claim 1 wherein a shift register based hardware block coupled to the output of the digital spectrum filter, detects absence of "n" pixels in a row, within a row of a frame, wherein "n" is an arbitrary number for detection of pixel spacing between two objects as follows of a same color or different color:
   a) the shift register is loaded with the number "n" each time the pixel identification mark from the output of the color spectrum memory is detected;
      "n" is an arbitrary number to denote the number of consecutive undetected pixels in a row, following the last pixel detection mark;
      the "n" in the shift register gets reduced by one, during each consecutive pixel time wherein the pixel detection mark is not found;
   b) at the end of "n" count the register generates a gap signal that signifies absence "n" number of pixels in a row;
      a) a Pixel Processor amends this gap information to the last detected pixel identification data written in a Video Data FIFO;
      b) Gap is the absent of a specified color pixel in a row from another specified color pixel or the same color pixel in the same row;
      c) Gap is absence of a specified color pixel in a row from another specified color pixel or the same color pixel.

3. A distributed processor consisting of a horizontal and vertical plurality of sub-processor wherein, individual processors are arranged in pre and post processing arrangement with respect to each other in a time synchronized heretical functional architecture, along with plurality of First In First Out memories, wherein FIFO's, links one processor to other to carry semi-processed data from one processor to another;
   a) distributed processor continually processes data received from the digital filter and convert such data into coordinate location, velocity, and acceleration of colored objects moving in six degree of freedom, the apparatus consists of the following:
      a Filter Processor;
      a Video Data FIFO;
      a Pixel Group Identifier Processor;
      a Group Identifier FIFO
      a Row (x) and Column (y) Coordinate Processor
      a Midpoint x (row) and Column (y) Coordinate FIFO
      a Delta Time Processor
      an object Identification Processor
      a Motion Distance and Rotation Detector
      a Vector Motion Measurement RAM
      a Motion Track FIFO
      a Motion Track Processor b) individual processors are synchronized to a video frame in which the tasks of each processor is synchronized to the start of a frame and each task has to be finished before the end of the same frame;

c) the sub processor functional tasks in the vertical direction is expanded in which each processor tasks is kept to a minimal;

d) the functional tasks of the processors in the horizontal direction is expanded such that each processor performs exact same function on different parts of the data within a frame's time;

e) frame's timing is utilized to direct the data flow such that each processor data is interleaved and directed based upon detailed timing within a frame.

4. The apparatus of claim 3 wherein the Filter Processor a coupled to a Color Spectrum Filter, reads pixel information from the color spectrum memory whenever the pixel detect mark appears at the output of the spectrum color filter, to denote the detection of a pixel color during that pixel timing and provides the following to Video Data FIFO:

a) The filtered color pixel data;
the multicolored object's spectrum identity number;
the group number (of colors) belonging to an object;

b) the frame row count at the end of a row from the video frame row counter c) the column count from a video frame coulomb counter at the end of the columns (end of a frame);

d) the pixel gap detect;

e) change the order of the Video Data FIFO from A to b, and B to A for the Filter Processor write and Pixel Identifier Processor read.

5. Apparatus of claims of 3, wherein the Pixel Group Identifier Processor, sorts and separates the colors of the received pixels based upon their color, color group identification, and x (row) coordinate address in which thy were detected during filtering, together with other statistical data of the pixels for the next stage of processing, the method comprising of the steps of (numbers in parenthesis refer to the points in FIG. 6):

a) at point (102) check for the new pixel from the Video FIFO;

b) at point (102), read and retain the first pixel's x coordinate reference along with color number and group number from the Video Data FIFO;

c) at point (104, read and retain the second pixel's x coordinate reference along with color number and group number from the Video Data FIFO;

d) at point (105), if it is the same color, transition to point (106) and do the following:
add to the number of pixel of same color within a row that are within a group;
keep the smallest and the largest x coordinate within the row;
discard the in-between x coordinate data;
transition to point 104;

e) at point (105), if it is not the same color, transition to point (107);

f) at point (107), if it belongs to the same group of colors, transition to point (104);

g) at point (107), if the color do not belong to the same group, write the following into the Group Identifier FIFO:
addition of all pixel of a group of colors that are found in a row;
midpoint reference x of the group of colors that are found in a row;
beginning and end coordinates address of the group of colors belonging to a group and ending with a gap mark;
initial and the end detection of a color pixel of the same color pixels before non-detection, gap;
column number of the of colors that they were found in a row;
transition to point (109);

h) At point (109), check for the gap mark, if there is no gap, generate an error message, and transition to point (104);

i) At point (109) if there is a gap, transition to point 111;

j) At point (111), check for the video Data FIFO empty signal and if it not empty, transition to point (102);

k) At point (111), if the FIFO is empty transition to point (113), l) At point (113) enable Group Identifier FIFO from A, to B for the next frame of data to write and B to A for the next stage processor to read, and transition to point (102).

6. The apparatus of claim 3 wherein the Midpoint x (row) and y (column) Coordinate processor coupled to the Group Identifier FIFO, sorts and identifies the midpoint x, and y coordinates of an object, it is based upon initially checking the two-midpoint reference coordinates and if they are equal it checks for the number of columns in which they were separated, if there were no separation it assumes the same object, otherwise it assumes that it is a new detected object, the method and the detailed functional activity is depicted in FIGS. 7, 7A, 7B, and 7C, and comprising of the steps of (numbers in parenthesis refer to the points in FIG. 7):

a) At point (131) stating from the first coordinate address in the Group Identifier FIFO, read the first entry of the x's midpoints for comparison;

b) At point (132) read the next entry from the Group Identifier FIFO and extend the second midpoint by +/-"n", wherein "n" denotes the separation and spacing of two x reference midpoint coordinates from one column to another;

c) At (133) starting from first x-"n" coordinate address compare the closeness of the two x midpoints;

d) At (133) if two midpoint x's are equal, transitions to point (134);

e) At point (133) if the two coordinate readings are not equal transition to point (137) to continue for the search in +/-n range;

f) At point (137), increment x by one and transition to point 138;

g) At point (138), if it is not the end of the search range for the midpoint x reference coordinate, transition to point (133);
At point (138) at the end of search, if the two x coordinates were not found to be in the same range, it signifies that the second coordinate belongs to a new object and transition is made to point (139);

h) At (134), check if the two midpoints are separated by "m" where m denotes the number of separations of columns, and if the are transition to (136);

i) At (134), if the two midpoint coordinates are not separated by separated by m, it assumes the coordinates is of the same object and transition to point (135);

j) At point (135) it assumes the coordinate is of the same object in closely located columns and does the following:
keep the smallest and the largest x coordinates for later calculation of the x midpoint reference in consecutive columns;
keep the first and the last column in which they were found;
transition to point (132);

k) At point (136) check for the FIFO empty signal;

l) At point (136), if the FIFO is not empty, go back to point 131, otherwise change the X, and Y coordinate FIFO's from A to B for the next frame's write, and next processor read from B to A and go to step 131);

m) At point (139), do the following:
calculate the x, and y midpoint coordinates;
add all the pixels of a same group found in different rows;
write the second reading to the back to the Group Identifier FIFO;
go back to point (131).

7. The apparatus of claim 3 wherein the Object Identification Processor, coupled to the x, and y coordinate FIFO identifies objects based upon the their emergence or disappearance on a new frame's midpoint coordinates address related to the row (x) and column (y), and comparison of the old coordinates in the old frame to the new coordinates in a new frame, the method comprising of the steps of (numbers refer to the points in FIG. 8):

a) at point 150, read the previous(old) frame's y, an x midpoint coordinates from the FIFO's A or B, and new frame's y, an x midpoint coordinates from the FIFO's B or A;

b) set the new midpoint y coordinates to y-m, wherein "m" denotes number of columns in witch two objects are considered to be separated;

c) set the new midpoint x coordinates by x-n wherein 2 times "n" denotes number of pixels in witch two objects are considered to be separated;

d) at point 152, look for the match of the old (previous) y coordinate to any one of the new coordinate within the range of "m", and if equal transition to point 155, otherwise transition to point 153;

e) at point 155, look for the match of the old (previous) x coordinate to the new x coordinate within the range of +/−n, if equal transition to point 158, otherwise go to step to point 156;

f) at point 158, perform the following:
write the objects coordinates along with the same object's mark to the Motion Track FIFO;
write the next x, and y coordinates back to the new FIFO;
transition to point 163;

g) At point 163 if it is not the end of a frame mark, repeat steps a) till the end of the frame, if the end of the frame, go back to point 150, otherwise wait for the new frame and go to point 150;

h) At point 154, since the new y could not be found, this signifies that the new y address is smaller, due to the appearance of a new object, then perform the following:
write the new object coordinate along with the new object mark to the next stage FIFO;
keep the old flame's y, and x midpoint coordinate;
read the new flame's y, and x midpoint coordinate;
set the new midpoint y to y-m, and the new x midpoint to x-n, and go to point 152;

i) at point 157, since the new x could not be found, this signifies that the new y, and x coordinate address is larger than the old and the old object has disappeared from the screen, then perform the following:
write the old object's disappearance mark to the next stage FIFO;
keep the new flame's y, and x midpoint coordinate;
read the old frame's y, and x midpoint coordinate;
set the new midpoint y to y-m, and the new x midpoint to x-n, and go to point 152.

8. The apparatus of claim 3 wherein the Rotation and Distance Processor apparatus coupled to the X, and Y Coordinate FIFO, measures the rotation angles and distances in z of a multi-colored object moving in six degree of freedom, based upon their individual pixel color counts facing a camera, the apparatus and the steps, comprising of the following:

a) set the total area for each color, that is the total pixel counts of colors and the group's color numbers, as an address to a memory wherein the data of the memory represent a prerecorded instantaneous angular positions of a moving object recorded during the calibration;
color areas of multicolored three dimensional objects moving in a three dimensional space, provides instantaneous measurement of distances in z as direction as well as rotational values of the object in a six degree of freedom;
multicolored objects moving in a three dimensional space, when detected by a camera, will register a unique signature of different color areas in each frame, wherein, the areas under each color of all the colors in a group of predefined colors, will represent a unique instantaneous angles of rotation in a three dimensional space and the total areas of different colors, provide an instantaneous magnitude of distance in z direction;
during calibration, the empirical real time motion detection of an object based upon their color exposure to a camera and the area count of all color portion and their associated color numbers are organized as the address to the memory and recorded to provide instantaneous values;

b) calibration of values of motion in z direction and the three instantaneous angular motion values are the result of empirical measurement of the area under each color and recording known vector motion values in a memory addressed by each group color number and detected area of each relevant colors;
The calibrated instantaneous value of z, and x, y, and z rotational vectors are recorded in a memory, while the address to the memory is the area under each particular color and the detected assigned color numbers;

c) if the rotational values are small, the change of motion in z direction is approximated by the ratios of past and resent detected value of total relevant color areas;

d) send the information to the Motion Track FIFO.

9. Apparatus of claim 3 wherein vector measurement of distance, velocities and accelerations are made from one frame to another frame, as follows:

a) vector velocities are derived by the changes in vector measurements during two frames divided by the elapsed time;

b) the vector accelerations are derived from the calculated velocities derived from the previous step divided by the elapsed time;
Elapsed time is measured between the detections of midpoints of same object in two frames.

10. The apparatus of claim 3 wherein the distributed processor architecture is made to eliminate processing numbers time as follows:

a) Individual processors consist of a memory based state machine wherein processing takes place within one clock period, eliminating clocks necessary to fetch the instruction from memory in a typical memory based CPU that includes, decoding instructions, and increment or decrement pointer addresses;

b) FiFO's are used as a storage of data only wherein, there is only a single address for the state machine to read, and a single address for the state machine to write to.

* * * * *